United States Patent
Yang (10) Patent No.: US 9,479,529 B2
(45) Date of Patent: *Oct. 25, 2016

(54) POLYMORPHIC SECURITY POLICY ACTION

(71) Applicant: SHAPE SECURITY, INC., Mountain View, CA (US)

(72) Inventor: Siying Yang, Cupertino, CA (US)

(73) Assignee: Shape Security, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,596

(22) Filed: Apr. 6, 2015

(65) Prior Publication Data

US 2016/0028760 A1 Jan. 28, 2016

Related U.S. Application Data (63) Continuation of application No. 14/338,207, filed on Jul. 22, 2014, now Pat. No. 9,003,511.

(51) Int. Cl.
  *H04L 29/06* (2006.01)
  *G06F 21/55* (2013.01)

(52) U.S. Cl.
  CPC .......... *H04L 63/1441* (2013.01); *G06F 21/55* (2013.01); *H04L 63/0227* (2013.01); *H04L 63/0263* (2013.01); *H04L 63/1416* (2013.01)

(58) Field of Classification Search
  CPC ................ H04L 63/0263; H04L 63/0227
  See application file for complete search history.

(56) References Cited

U.S. PATENT DOCUMENTS

| 5,003,596 A | 3/1991 | Wood |
| 5,315,657 A | 5/1994 | Abadi et al. |

(Continued)

FOREIGN PATENT DOCUMENTS

| CN | 101471818 A | 7/2009 |
| CN | 101471818K2 | 5/2011 |

(Continued)

OTHER PUBLICATIONS

Egele et al., "Defending Browsers against Drive-by Downloads: Mitigating Heapspraying Code Injection Attacks," Detection of Intrusions and Malware and Vulnerability Asses. Lecture, dated 2009 19pages.

(Continued)

*Primary Examiner* — Saleh Najjar
*Assistant Examiner* — Oleg Korsak
(74) *Attorney, Agent, or Firm* — Hickman Palermo Becker Bingham LLP (57) ABSTRACT

In one embodiment, a method of improving the security of a computing device comprises using a computing device that has received one or more messages that have been determined as unauthorized, obtaining a plurality of state data values from one or more of the computing device, the one or more messages, and a second computer; before admitting the one or more messages to a data communications network that the computing device is configured to protect: using the computing device and pseudo-random selection logic, based on the state data values, pseudo-randomly selecting a particular policy action from among a plurality of different stored policy actions; using the computing device, acting upon the one or more messages using the particular policy action; wherein the method is performed using one or more computing devices.

14 Claims, 4 Drawing Sheets

(56) References Cited

U.S. PATENT DOCUMENTS

| | | | |
|---|---|---|---|
| 5,870,769 A | 2/1999 | Freund | |
| 5,974,549 A | 10/1999 | Golan | |
| 5,987,611 A | 11/1999 | Freund | |
| 6,006,328 A | 12/1999 | Drake | |
| 6,170,020 B1* | 1/2001 | Blakeney | G06F 1/1632 710/10 |
| 6,401,077 B1 | 6/2002 | Godden | |
| 6,668,325 B1 | 12/2003 | Collberg | |
| 6,938,170 B1 | 8/2005 | Kraft | |
| 6,957,229 B1 | 10/2005 | Dyor | |
| 7,103,180 B1 | 9/2006 | McGregor | |
| 7,117,429 B2 | 10/2006 | Vedullapalli et al. | |
| 7,180,895 B2* | 2/2007 | Smith | H04L 47/10 370/394 |
| 7,334,254 B1 | 2/2008 | Boydstun et al. | |
| 7,464,326 B2 | 12/2008 | Kawai et al. | |
| 7,480,385 B2 | 1/2009 | Weber | |
| 7,500,099 B1 | 3/2009 | McElwee et al. | |
| 7,580,521 B1 | 8/2009 | Spies et al. | |
| 7,587,616 B2 | 9/2009 | Jakubowski | |
| 7,620,987 B2 | 11/2009 | Shelest | |
| 7,705,829 B1 | 4/2010 | Plotnikov | |
| 7,707,223 B2 | 4/2010 | Zubenko et al. | |
| 7,895,653 B2 | 2/2011 | Calo et al. | |
| 7,940,657 B2* | 5/2011 | Perreault | H04L 63/0227 370/229 |
| 7,961,879 B1 | 6/2011 | Spies | |
| 7,975,308 B1 | 7/2011 | Satish et al. | |
| 8,020,193 B2 | 9/2011 | Bhola et al. | |
| 8,077,861 B2 | 12/2011 | Damgaard | |
| 8,086,756 B2 | 12/2011 | Kamyshenko et al. | |
| 8,086,957 B2 | 12/2011 | Bauchot et al. | |
| 8,170,020 B2 | 5/2012 | Oliver et al. | |
| 8,200,958 B2 | 6/2012 | Coppola et al. | |
| 8,220,054 B1 | 7/2012 | Lu | |
| 8,225,401 B2 | 7/2012 | Sobel et al. | |
| 8,266,202 B1 | 9/2012 | Colton et al. | |
| 8,266,243 B1 | 9/2012 | Carlson et al. | |
| 8,332,952 B2 | 12/2012 | Zhang et al. | |
| 8,347,396 B2 | 1/2013 | Grigsby et al. | |
| 8,392,576 B1 | 3/2013 | Henderson | |
| 8,392,910 B1 | 3/2013 | Asher | |
| 8,516,080 B2 | 8/2013 | Chow | |
| 8,527,774 B2 | 9/2013 | Fallows et al. | |
| 8,533,480 B2 | 9/2013 | Pravetz et al. | |
| 8,548,998 B2* | 10/2013 | Plotnik | H04L 63/0263 707/736 |
| 8,555,385 B1 | 10/2013 | Bhatkar et al. | |
| 8,601,064 B1* | 12/2013 | Liao | H04L 51/12 709/206 |
| 8,627,479 B2 | 1/2014 | Wittenstein et al. | |
| 8,661,549 B2 | 2/2014 | Chevallier-Mames | |
| 8,676,273 B1 | 3/2014 | Fujisaki | |
| 8,762,705 B2 | 6/2014 | He | |
| 8,904,279 B1 | 12/2014 | Bougon | |
| 8,954,583 B1 | 2/2015 | Zhou et al. | |
| 9,241,004 B1 | 1/2016 | April | |
| 9,294,502 B1 | 3/2016 | Benishti | |
| 2002/0099827 A1 | 7/2002 | Shah et al. | |
| 2003/0159063 A1 | 8/2003 | Apfelbaum et al. | |
| 2004/0101142 A1 | 5/2004 | Nasypny | |
| 2004/0162994 A1* | 8/2004 | Cohen | H04L 63/1491 726/22 |
| 2004/0230889 A1 | 11/2004 | Ishiyama | |
| 2004/0245525 A1 | 12/2004 | Yamazaki | |
| 2004/0249938 A1 | 12/2004 | Bunch | |
| 2006/0015941 A1 | 1/2006 | McKenna | |
| 2006/0034455 A1 | 2/2006 | Damgaard et al. | |
| 2006/0053295 A1 | 3/2006 | Madhusudan et al. | |
| 2006/0075260 A1 | 4/2006 | Tucker | |
| 2006/0156278 A1 | 7/2006 | Reager | |
| 2006/0195588 A1 | 8/2006 | Pennington et al. | |
| 2007/0011295 A1 | 1/2007 | Hansen | |
| 2007/0039048 A1 | 2/2007 | Shelest | |
| 2007/0064617 A1 | 3/2007 | Reves | |
| 2007/0074227 A1 | 3/2007 | Naidu | |
| 2008/0025496 A1 | 1/2008 | Smith et al. | |
| 2008/0183902 A1 | 7/2008 | Cooper et al. | |
| 2008/0222736 A1 | 9/2008 | Boodaei et al. | |
| 2008/0229394 A1 | 9/2008 | Stering et al. | |
| 2008/0244078 A1 | 10/2008 | Viljoen et al. | |
| 2008/0250310 A1 | 10/2008 | Chen | |
| 2008/0320567 A1 | 12/2008 | Shulman | |
| 2009/0007243 A1 | 1/2009 | Boodaei et al. | |
| 2009/0077383 A1 | 3/2009 | De Monseignat | |
| 2009/0119515 A1 | 5/2009 | Nicolson | |
| 2009/0193497 A1 | 7/2009 | Kikuchi | |
| 2009/0193513 A1 | 7/2009 | Agarwal et al. | |
| 2009/0216882 A1 | 8/2009 | Britton | |
| 2009/0235089 A1 | 9/2009 | Ciet | |
| 2009/0241174 A1 | 9/2009 | Rajan et al. | |
| 2009/0249492 A1 | 10/2009 | Boesgaard Sorensen | |
| 2009/0254572 A1 | 10/2009 | Redlich | |
| 2009/0282062 A1 | 11/2009 | Husic | |
| 2009/0292984 A1 | 11/2009 | Bauchot et al. | |
| 2010/0037150 A1 | 2/2010 | Sawant | |
| 2010/0083072 A1 | 4/2010 | Prasad | |
| 2010/0100927 A1 | 4/2010 | Bhola et al. | |
| 2010/0107245 A1 | 4/2010 | Jakubowski | |
| 2010/0131512 A1 | 5/2010 | Ben-Natan | |
| 2010/0172494 A1 | 7/2010 | Henson | |
| 2010/0180346 A1 | 7/2010 | Nicolson | |
| 2010/0186089 A1 | 7/2010 | Fu et al. | |
| 2010/0191962 A1 | 7/2010 | Yan et al. | |
| 2010/0235637 A1 | 9/2010 | Lu et al. | |
| 2010/0235910 A1 | 9/2010 | Ku et al. | |
| 2010/0257354 A1 | 10/2010 | Johnston et al. | |
| 2010/0262780 A1 | 10/2010 | Mahan | |
| 2010/0281459 A1 | 11/2010 | Betouin | |
| 2011/0015917 A1 | 1/2011 | Wang et al. | |
| 2011/0022846 A1 | 1/2011 | Ginter | |
| 2011/0047169 A1 | 2/2011 | Leighton et al. | |
| 2011/0107077 A1 | 5/2011 | Henderson et al. | |
| 2011/0129089 A1 | 6/2011 | Kim | |
| 2011/0131416 A1 | 6/2011 | Schneider | |
| 2011/0154021 A1 | 6/2011 | McCann et al. | |
| 2011/0178973 A1 | 7/2011 | Lopez et al. | |
| 2011/0239113 A1 | 9/2011 | Hung et al. | |
| 2011/0255689 A1 | 10/2011 | Bolotov et al. | |
| 2011/0296391 A1 | 12/2011 | Gass et al. | |
| 2012/0011262 A1 | 1/2012 | Cheng et al. | |
| 2012/0022942 A1 | 1/2012 | Holloway et al. | |
| 2012/0023394 A1 | 1/2012 | Pieczul et al. | |
| 2012/0030248 A1 | 2/2012 | Blinnikka | |
| 2012/0096116 A1 | 4/2012 | Mislove et al. | |
| 2012/0117649 A1 | 5/2012 | Holloway et al. | |
| 2012/0124372 A1 | 5/2012 | Dilley et al. | |
| 2012/0173699 A1 | 7/2012 | Niemela | |
| 2012/0173870 A1 | 7/2012 | Reddy et al. | |
| 2012/0174225 A1 | 7/2012 | Shyamsunder | |
| 2012/0180021 A1 | 7/2012 | Byrd et al. | |
| 2012/0198528 A1 | 8/2012 | Baumhof | |
| 2012/0216251 A1 | 8/2012 | Kumar et al. | |
| 2012/0254845 A1 | 10/2012 | Yi | |
| 2012/0255006 A1 | 10/2012 | Aly | |
| 2013/0041986 A1 | 2/2013 | Colton et al. | |
| 2013/0055287 A1 | 2/2013 | Pope et al. | |
| 2013/0067225 A1 | 3/2013 | Shochet | |
| 2013/0091582 A1 | 4/2013 | Chen et al. | |
| 2013/0152071 A1 | 6/2013 | Asher | |
| 2013/0198607 A1 | 8/2013 | Mischook et al. | |
| 2013/0219256 A1 | 8/2013 | Lloyd et al. | |
| 2013/0227397 A1 | 8/2013 | Tvorun et al. | |
| 2013/0232234 A1 | 9/2013 | Kapur et al. | |
| 2013/0232343 A1 | 9/2013 | Horning | |
| 2013/0232578 A1 | 9/2013 | Chevallier-Mames | |
| 2013/0263264 A1 | 10/2013 | Klein et al. | |
| 2013/0340043 A1 | 12/2013 | Zarei et al. | |
| 2014/0040787 A1 | 2/2014 | Mills | |
| 2014/0053059 A1 | 2/2014 | Weber et al. | |
| 2014/0165197 A1 | 6/2014 | Ur | |
| 2014/0189499 A1 | 7/2014 | Gigliotti | |
| 2014/0223290 A1 | 8/2014 | Hathaway | |
| 2014/0281535 A1 | 9/2014 | Kane | |

(56) References Cited

U.S. PATENT DOCUMENTS

| | | |
|---|---|---|
| 2014/0282872 A1 | 9/2014 | Hansen |
| 2014/0283069 A1 | 9/2014 | Call |
| 2014/0359571 A1 | 12/2014 | Sasikumar et al. |
| 2015/0039962 A1 | 2/2015 | Fonseka |
| 2015/0067853 A1 | 3/2015 | Amrutkar |
| 2015/0180509 A9 | 6/2015 | Fonseka |
| 2016/0028760 A1 | 1/2016 | Yang et al. |
| 2016/0057111 A1 | 2/2016 | Call et al. |
| 2016/0080515 A1 | 3/2016 | Kruglick |
| 2016/0149953 A1 | 5/2016 | Hidayat et al. |

FOREIGN PATENT DOCUMENTS

| | | |
|---|---|---|
| GB | 2 443 093 A | 4/2008 |
| WO | WO9964967 A1 | 12/1999 |
| WO | WO00/72119 A2 | 11/2000 |
| WO | WO02/093369 A1 | 11/2002 |
| WO | WO02088951 A1 | 11/2002 |
| WO | WO2004109532 A1 | 12/2004 |
| WO | WO2008095018 A2 | 8/2008 |
| WO | WO2008095031 A1 | 8/2008 |
| WO | WO2008130946 A2 | 10/2008 |
| WO | WO2010/046314 A1 | 4/2010 |
| WO | WO2013/091709 A1 | 6/2013 |

OTHER PUBLICATIONS

International Searching Authority, "Search Report" in application No. PCT/2014/027805, dated Aug. 18, 2014, 14 pages.

International Searching Authority, "Search Report" in application No. PCT/2014/027805, dated Aug. 14, 2014, 14 pages.

International Searching Authority, "Search Report" in application No. PCT/2014/023897, dated Jul. 18, 2014, 15 pages.

H. Krawczyk, "HMAC-Based Extract-and-Expand Key Derivation Function, (HKDF)", RFC 5869, IETF, May 2010, 10 pages.

Google Search, "Google Patents Search Results" dated May 21, 2014, 2 pages.

Anderson et al., "Measuring the Cost of Cybercrime," 2012 Workshop on the Economics of Information Security (WEIS), [retrieved on Oct. 15, 2013], 31 pages.

Entrust, "Defeating Man-in-the-Browser Malware," Entrust.com [online] Sep. 2012 [retrieved Oct. 15, 2013]. Http://download.entrust.com/resources/download.cfm/24002/>, 18 pages.

Krebs on Security, In-depth security news and investigation, "A Closer Look at Rapport from Trusteer", dated Apr. 29, 2010, 16 pages.

Dougan et al., International Journal of Ambient Computing and Intelligence, dated Jan.-Mar. 2012, pp. 29-39.

D. Kristol, "HTTP State Management Mechanism", RFC 2965, IETF, dated Oct. 2000, 19 pages.

Currie et al., In-the-Wire Authentication: Protecting Client-Side Critical Data Fileds in Secure Network Transactions, dated 2009 2nd International Con. Adapt. Science & Tech. IEEE, pp. 232-237.

Cova et al., "Detection and Analysis of Drive-by-Download Attacks and Malicious JavaScript Code," World Wide Web Conference Committee, Apr. 26-30, 2010. 10 pages.

CodeSealer, "CodeSealer," codesealer.com [online] 2013 http://web.archive.org/web/20130829165031/http://codesealer.com/technology.html>, 2 pages.

Boston University Information Services & Technology "Understanding Authentication, Authorization, and Encryption," online Jul. 1, 2014, www.bu.edu/tech/services/security/resources/bestpratice, 4 pgs.

European Patent Office, "Search Report" in application No. PCT/US2014/023635, dated Jan. 21, 2015, 11 pages.

Rutkowska, "Rootkits vs. Stealth by Design Malware," Black Hat Europe, 2006.Internet: www.blackhat.com/presentations/bh-europe-06/bh-eu-06-Rutkowska.pdf> 44 pages.

Vasco, "Hardened Browser," vasco.com [online] [retrieved on Oct. 15, 2013]. Retrieved from the Internet: www.vasco.com/products/client_products/pki_digipass/hardened_browser.as px>, 2 pages.

Trusteer, "Trusteer Rapport, Endpoint-centric Fraud Prevention", from the web http://www.trusteer.com/products/trusteer-rapport, last accessed on Jan. 9, 2013, 2 pages.

Team Cymru, "Cybercrime—an Epidemic," Queue, 4(9):24-35, Nov. 2006, trygstad.rice.iit.edu:8000/Articles/Cybercrime%20-%-%20An%20Epidemic%20-%20ACM%20Queue., 3 pages.

Sood et al., "The Art of Stealing Banking Information—Form grabbing on Fire," Virus Bulletin, Nov. 2011, www.virusbtn.com/virusbulletin/archive/2011/11/vb201111-form-grabbing>, 24 pages.

Sood and Enbody, "Browser Exploit Packs—Exploitation Tactics," Virus Bulletin Conference, Oct. 2011, http://www.secniche.org/papers/VB_2011_BRW_EXP_PACKS_AKS_RJE.pdf>, 9 pages.

Sood and Enbody, "A Browser Malware Taxonomy," Virus Bulletin, Jun. 2011. Retrieved from the Internet: <URL:http://www.secniche.org/released/VB_BRW_MAL_TAX_AKS_RJE.pdf>, 5 pages.

International Searching Authority, "Search Report" in application No. PCT/US2014/024232, dated Aug. 1, 2014, 52 pages.

SafeNet, "Prevent Financial Fraud and Man-in-the-Browser Attacks," safenet-inc.com [online Oct. 15, 2013]. Safenet-inc.com/solutions/data-protection/financialservices, 5 pages.

IP.com, "Search Results", Patents and Applications, http://ip/com/search/results.html, dated May 6, 2014, 2 pages.

RSA, "RSA Offers Advanced Solutions to Help Combat Man-In-The-Browser Attacks," rsa.com [online] May 18, 2010, web.archive.org/web/20111111123108/, 3 pages.

Rieck et al., "Cujo: Efficient Detection and Prevention of Drive-by-Download Attacks", ACSAC, Dated Dec. 2010, 9 pages.

Pattabiraman et al., "DoDOM: Leveraging DOM Invariants for Web 2.0 Application Robustness Testing" dated 2010, IEEE, 10 pages.

Oh, "Recent Java exploitation trends and malware," Black Hat USA 2012, Internet: https://media.blackhat.com/bh-us-12/Briefings/Oh/BH_US_12_0h_Recent Java_ExploitationTrends_and_Malware_WP, 27 pages.

Marcus and Sherstobitoff, "Dissecting Operation High Roller," McAfee [online] 2012 [retrieved on Oct. 15, 2013]. Http://www.mcafee.com/us/resources/reports/rpoperation-high-roller.pdf>, 20 pages.

Wikipedia [online]. "MD5," Jun. 30, 2014, [Retrieved on Jul. 1, 2014]. Retrieved from Internet: <URL: http://en.wikipedia.org/wiki/MD5>. 12 pages.

Shackleford, D. "Application Whitelisting: Enhancing Host Security," SANS Institute Reading Room, Oct. 2009, 16 pages.

International Searching Authority, "Search Report" in application No. PCT/US15/12072, dated Jan. 20, 2015, 14 pages.

Sedaghat et al., "On-The-Fly Web Content Integrity Check Boosts User's Confidence", Communications for the ACM, vol. 45, Issue 11, dated Nov. 2002, 5 pages.

Matsunaka et al., "Detecting and Preventing Drive-By Download Attack via Participative Monitoriing of the Web", Information Security, dated Jul. 26, 2013, 8th Asia Joint Conference, pp. 48-55.

European Patent Office, "Search Report" in application No. PCT/US2015/031361, dated Jul. 28, 2015, 13 pages.

Li et al., "WebShield: Enabling Various Web Defense Techniques Without Client Side Modifications", dated Aug. 15, 2009, 18 pages.

European Patent Office in application No. PCT/US2014/068133, dated Apr. 7, 2015, 14 pages.

Claims in European Application No. PCT/US2014/068133, dated Apr. 2015, 16 pages.

International Searching Authority, "Search Report" in application No. PCT/US2015/049024, dated Jan. 19, 2016, 10 pages.

Claims in application No. PCT/US2015/049024, dated Jan. 2016, 8 pages.

Davido et al., "Understanding Split and Join", PerlMonks, http://www.perlmonks.org/?node_id=591988, dated Dec. 28, 2006, 10 pages.

U.S. Appl. No. 14/968,460, filed Dec. 14, 2015, Office Action, Apr. 8, 2016.

(56) References Cited

OTHER PUBLICATIONS

U.S. Appl. No. 14/618,389, filed Feb. 10, 2015, Notice of Allowance, Mar. 16, 2016
U.S. Appl. No. 14/618,389, filed Feb. 10, 2015, Supplemental Notice of Allowability, Apr. 12, 2016
U.S. Appl. No. 14/602,038, filed Jan. 21, 2015, Office Action, Apr. 22, 2016
U.S. Appl. No. 14/570,466, filed Dec. 15, 2014, Office Action, Apr. 21, 2016
U.S. Appl. No. 14/481,867, filed Sep. 9, 2014, Office Action, Apr. 8, 2016
U.S. Appl. No. 14/286,324, filed May 23, 2014, Final Office Action, Apr. 20, 2016.
Davido et al. "Understanding Spilt and Join", PerlMonks, http://www.perlmonks.org/?node_id=591988, dated Dec. 28, 2006, 10 pages.
U.S. Appl. No. 14/702,349, filed May 1, 2015, Office Action, Feb. 1, 2016.
W3Schools.com. "Javascript Timing Events", dated Dec. 31, 2013, accessed online, http://web.archive.org/web/20131231074905/http://w3schools.com/js/js_timing.asp, 30 pages.
The International Bureau of WIPO, "International Preliminary Report on Patentability" in application No. PCT/US2014/068133, dated Jun. 21, 2016, 12 pages.
Claims in application No. PCT/US2014/068133, dated Jun. 2016, 16 pages.
U.S. Appl. No. 14/702,140, filed May 1, 2015, Final Office Action, May 19, 2016.
U.S. Appl. No. 14/481,835, filed Sep. 9, 2014, Notice of Allowance, Apr. 27, 2016
U.S. Appl. No. 14/329,718, filed Jul. 11, 2014, Final Office Action, May 6, 2016.

* cited by examiner

POLYMORPHIC SECURITY POLICY ACTION

PRIORITY CLAIM

This application claims the benefit as a Continuation of application Ser. No. 14/338,207, filed Jul. 22, 2014, the entire contents of which are hereby incorporated by reference for all purposes as if fully set forth herein. The applicant(s) hereby rescind any disclaimer of claim scope in the parent applications or the prosecution history thereof and advise the USPTO that the claims in this application may be broader than any claim in the parent application(s).

FIELD OF THE DISCLOSURE

The present disclosure generally relates to network security technology in devices such as firewalls and security gateways. The disclosure relates more specifically to techniques for use in network security devices in response to detecting attacks or other unauthorized traffic.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Malicious users of computer networks commonly use network reconnaissance as the first stage of advanced attacks. Attackers use reconnaissance tools from multiple layers of the Open Systems Interconnect (OSI) network model to gather information on target networks and systems. The gathered information can be analyzed together with known vulnerabilities to gain access to secure networks and computers. The success rate of subsequent attacks largely depends on the accuracy and stability of the reconnaissance results.

Security products such as firewalls and intrusion prevention systems are deployed logically in front of target systems, such as application server computers, to actively prevent malicious attacks. The security policies on these products are designed and updated by IT administrators. While providing designed protection to the target systems, these security policies generate deterministic actions on a given set of incoming network traffic. Attackers may exploit the deterministic nature of the policy actions to figure out what are already prevented and what are still vulnerable. The attackers can then use this information to develop evasion techniques and eventually penetrate the security products.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described according to the following outline:

1. Overview
2. Example Polymorphic Security System
3. Example Polymorphic Security Methods
   3.1 Pseudo-random selection of policy actions
   3.2 Coexistence of regular and polymorphic policy actions
   3.3 Scheduled polymorphic policy actions
   3.4 Implementation and applicability
4. Implementation Mechanisms—Hardware Overview 1. Overview In one aspect, a method of improving the security of a computing device comprises using a computing device that has received one or more messages that have been determined as unauthorized, obtaining a plurality of state data values from one or more of the computing device, the one or more messages, and a second computer; before admitting the one or more messages to a data communications network that the computing device is configured to protect: using the computing device and pseudo-random selection logic, based on the state data values, pseudo-randomly selecting a particular policy action from among a plurality of different stored policy actions; using the computing device, acting upon the one or more messages using the particular policy action; wherein the method is performed using one or more computing devices.

In this context, "pseudo-random" may refer to processes that appear to be random but are not strictly random. For example, software processes may be used that exhibit statistical randomness while being generated using techniques that technically are deterministic and reproducible. Pseudo-random processes typically are easier to implement. In some embodiments, truly random processes may be used, based upon hardware random number generators, function calls to random number generators in operating systems, measurements of voltage or user input devices, and similar techniques.

Further, in this context, "message" is used for convenience to refer broadly to any set of one or more frames, packets, segments, or other data directed to the computing device. For example, a message may be a TCP segment, a probe packet, an HTTP request carried in one or more packets, an application-layer message in one or more packets, or any other data that is directed to the computing device.

In one feature, the plurality of different policy actions comprises any two or more of: pass, drop request, drop request and close connection, redirect to an error page, inject cookie, block network address, block application user, whitelist network address, blacklist network address. In another feature, the plurality of data values comprises any two or more of: system time on the computing device; system load on the computing device; attack severity level; source network address.

In an embodiment, the method further comprises performing the pseudo-randomly selecting only during a particular limited time period that is defined in stored schedule data. In yet another feature, the state data values comprise one or more attributes of the one or more messages, and one or more operating values indicating operating characteristics of the computing device. In some embodiments, the method comprises using hash value generating logic, generating a hash value that is based upon the state data values; using the pseudo-random selection logic, using the hash value as an index into a list of stored different policy actions, pseudo-randomly selecting a particular policy action from among the plurality of policy actions.

In another embodiment, the method further comprises determining that the state data values match a particular policy rule from among a plurality of different policy rules; determining that the particular policy rule is marked for polymorphic treatment; using the pseudo-random selection logic, performing the pseudo-randomly selecting using a particular policy action that corresponds to the particular policy rule and a second particular policy action. In another embodiment, the method comprises performing the pseudo-randomly selecting only from among a subset of the plurality of different policy actions that include a marking specifying polymorphic treatment. In another embodiment, the method comprises performing the pseudo-randomly selecting only during a particular limited time period that is defined in stored schedule data; performing the pseudo-randomly selecting only from among a subset of the plurality of different policy actions that include a marking specifying polymorphic treatment.

In another aspect, an electronic digital network security device comprises one or more processors; one or more first network interfaces that are configured to couple to a client computer; one or more second network interfaces that are coupled to a server computer that the security device is configured to protect from attack; one or more non-transitory computer-readable storage media coupled to the one or more processors and storing one or more sequences of instructions which when executed by the one or more processors cause performing: receiving one or more messages that are determined as unauthorized; obtaining a plurality of state data values from one or more of the security device, the one or more messages, and a second computer; before providing the one or more messages to the server computer: using pseudo-random selection logic, based on the state data values, pseudo-randomly selecting a particular policy action from among a plurality of different stored policy actions; acting upon the one or more messages using the particular policy action.

Embodiments are configured to introduce polymorphism into security policy actions. For example, using polymorphic policy actions, a security device may be configured to enforce policy actions in a randomized or pseudo-randomized way. In one embodiment, for the same set of network attack traffic, depending on the current time, the application user and one or more other relevant input data values, the security device may perform different actions on messages that have been identified as relating to an attack. Example actions include drop, pass, redirect, and block network address. In an embodiment, the randomization or pseudo-random responses occur without the need for administrators to manually update policy data in the security device. Using the polymorphic policy actions to respond to messages associated with attacks, the security device externally appears unpredictable to attackers, and inferring target vulnerabilities from the reconnaissance results becomes far more difficult. Therefore, embodiments offer the benefit of dramatically increasing the cost, to an attacker, of network reconnaissance and reverse engineering.

In various embodiments, polymorphic policy actions also may be performed using a schedule, in which particular policy actions are linked to a particular time window. In addition to confusing attackers, using scheduled polymorphic policy action also provides administrators a more flexible way of selectively and programmatically enabling security policy rules.

2. Example Polymorphic Security System

Figure 1:
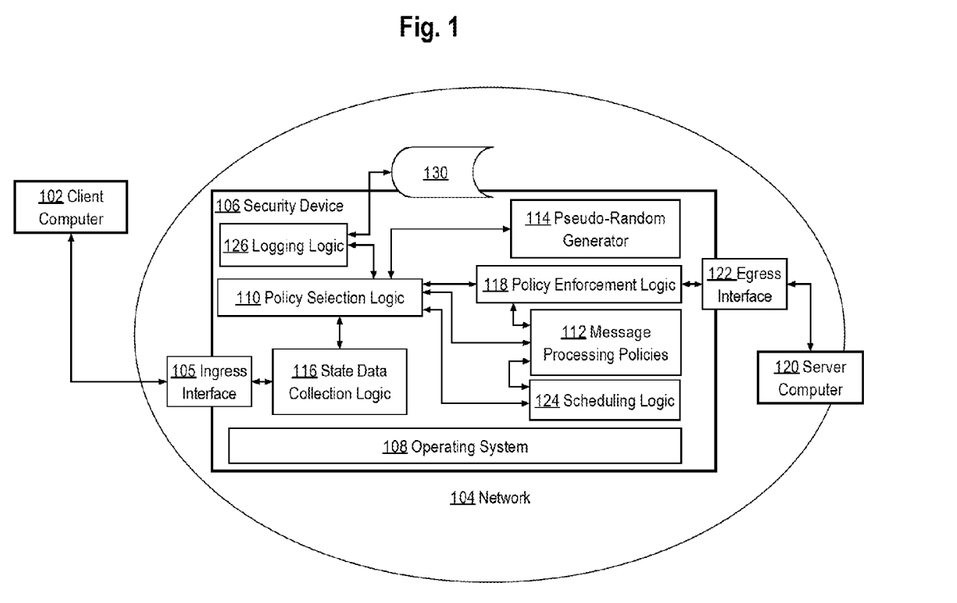
FIG. 1 illustrates an example computer system including a computer security device that is configured to implement an embodiment.

FIG. 1 illustrates an example computer system including a computer security device that is configured to implement an embodiment. In the example of FIG. 1, a client computer 102 is coupled directly or indirectly through one or more local networks, wide area networks or internetworks to a network 104 that includes a security device 106 and a server computer 120. Typically security device 106 is a special-purpose computer that may perform inspection tasks and act upon incoming packets, segments, messages or flows based upon stored policy; in some cases the security device also performs routing and/or switching functions. Embodiments may be implemented using any security device 106 that actively prevents attacks based upon configurable security policy and configured to evaluate and act on frames, packets, segments or messages at layer 3, 4, 5, 6 or 7 of the Open Systems Interconnect (OSI) internetworking model. Examples of security device 106 include network firewalls, intrusion prevention systems, unified threat management systems, web application firewalls, the SHAPESHIFTER botwall commercially available from Shape Security, Inc., Mountain View, Calif., and others.

As seen in FIG. 1, the security device 106 is deployed logically between the client computer 102 or other network client, such as a browser at a network end station, and the server computer 120 or other target such as a website or web application server. In this configuration, the security device 106 is arranged to inspect traffic between the client computer 102 and server computer 120. In one embodiment, messages originated at client computer 102 and directed toward server computer 120 are received at an ingress interface 105 and provided to processing logic within the security device 106; if a decision is made to pass through the messages, then the messages are moved to egress interface 122, which is coupled to server computer 120.

In an embodiment, security device 106 comprises policy selection logic 110 coupled to message processing policies 112, pseudo-random generator 114, state data collection logic 116, policy enforcement logic 118, scheduling logic 124, and logging logic 126 which may be coupled to data storage 130. The logical elements shown in FIG. 1 may be implemented using special-purpose circuits such as ASICs or FPGAs, or may be implemented using firmware, one or more computer programs or other software elements hosted using operating system 108.

In an embodiment, policy selection logic 110 is configured to select from among the message processing policies 112 and to provide a selected policy to policy enforcement logic 118 for use in taking action on messages received on ingress interface 105. For example, when an attack is identified, the security device 106 takes an action based on configurable security policy. In an embodiment, state data collection logic 116 is configured to determine one or more state data values at the time that messages are received for use as a basis of generating, pseudo-randomly, an index value into the message processing policies 112 or to pseudo-randomly directly select one of the message processing policies for use. Particular techniques for determining the state data values and the index value or other selection are further described herein.

In an embodiment, the scheduling logic 124 is configured to determine whether a particular scheduled time period is configured in association with the message processing policies 112 and to trigger the enforcement of a particular policy only within the time period associated with that particular policy. Particular techniques for doing so are further described herein.

In an embodiment, the logging logic 126 is configured to store log records representing one or more of the received messages, selected policies, and data relating to enforcement in records in data storage 130. For example, a record may specify a message flow using a five-tuple of TCP/IP header values (source address, destination address, source port, destination port, protocol identifier) in association with a policy identifier and a selected enforcement action.

In an embodiment, message processing policies 112 may be created and maintained by IT administrators. Policies 112 may specify, for any particular kind of message, whether that type of message is unauthorized. In other words, a message is unauthorized and subject to pseudo-random processing as described herein based upon definitions in policies 112, rather than based upon the inherent type, nature or structure of the message. Typically a security policy comprises a security operation and a security policy action. The security operation defines a set of detection and prevention procedures that the security device 106 applies on the incoming and outgoing traffic. The security policy action defines the procedure to follow once an attack is identified by the security operation. The security policy actions may apply on different OSI layers. Example actions include:

Pass, aka "no action";
Silently perform passive action such as writing a log record;
Drop request (layer 3);
Drop request and close connection (layer 4);
Redirect client to an error page (layer 7);
Redirect client to a CAPTCHA page (layer 7);
Inject application cookie to inspect client's future requests (layer 7);
Perform other injection techniques at layers lower than layer 7;
Block client IP address (layer 3);
Block application user (layer 7);
Blacklist client IP address (layer 3).

Injection techniques at layers lower than layer 7 may include, for example, injecting fields within the network payload that are known to be returned unmodified or modified in a predictable way by the recipient.

Various embodiments may use various subsets of the preceding list of actions. Embodiments may select and use only a set of the preceding actions that is appropriate for network 104 based upon policy, security requirements, or other factors. For example, passing through messages that are known to represent an attack vector may be impermissible and excluded from the list.

3. Example Polymorphic Security Methods 3.1 Pseudo-Random Selection of Policy Actions In some environments, a malicious user of the client computer 102 may use one or more network reconnaissance tools that view the security device 106 and target server computer 120 as one single entity. Attackers use the network reconnaissance tools to send large amounts of probing requests to the target security device 106. Some requests may be identified by the security device 106 and dropped. Some requests may penetrate the security device 106 and reach the target server computer 120. Attackers may exploit their knowledge of whether a reconnaissance request obtains a successful response from the server computer 120. By correlating the responses with known vulnerabilities, the attackers may develop potential evasion and exploitation techniques. For example, attackers may be able to determine what services are available in a network and/or whether particular ports are open. The network reconnaissance tools also may operate on different OSI layers; examples include: Port scanner (layer 4); Network enumerator (layer 3-7); Network vulnerability scanner (layer 3-7); Web application security scanner (layer 7).

In various embodiments, data processing methods as described herein may be used in a network security device to make the security device's behavior unpredictable to attackers. With polymorphic security policy actions, the security device 106 no longer takes deterministic actions on identified attack requests, as specified in the configured security policy. Instead, the responsive action performed by the security device 106 in response to a particular kind of attack, or a particular kind of input data associated with messages or requests from the client computer 102, may vary pseudo-randomly over time. As a result, to the client computer 102, the responsive action of the security device and/or server computer 120 may be indistinguishable from random behavior. Therefore, it may be impossible, or at least far more difficult, for an attacker to determine what attack mechanism, messages, vectors, or data to use in an attempt to attack the security device 106, server computer 120, or other elements of a protected network.

Figure 2:
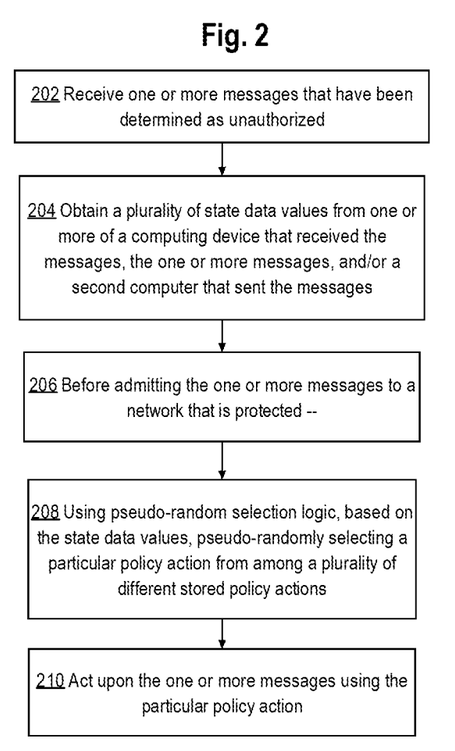
FIG. 2 illustrates an example process of responding using polymorphism to network attacks.
Figure 3:
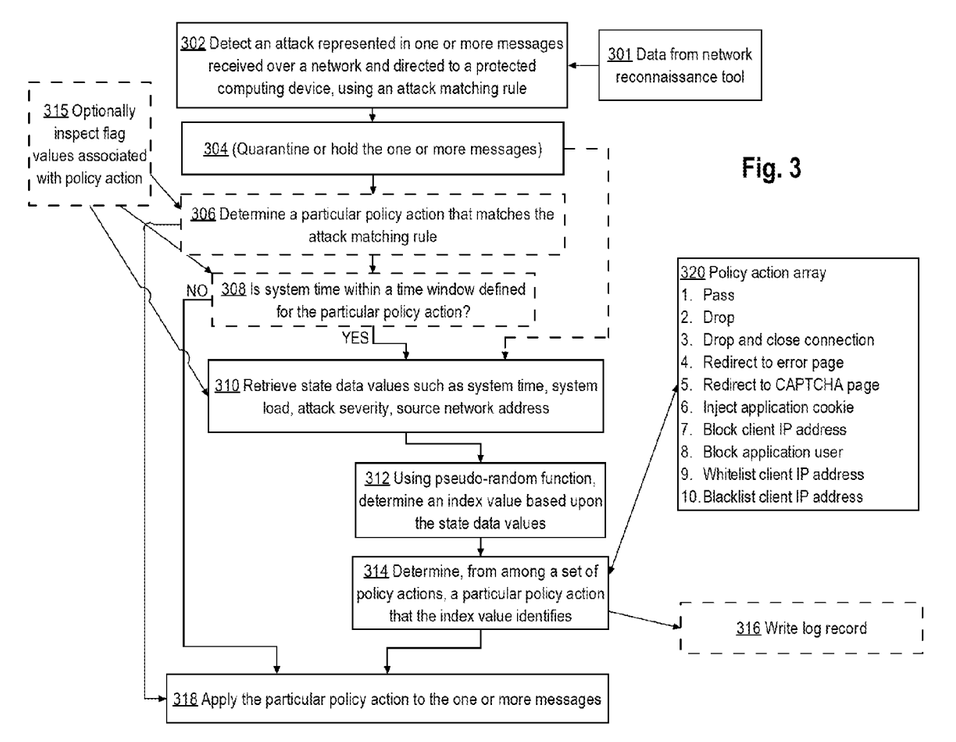
FIG. 3 illustrates a second example process of responding using polymorphism to network attacks.

FIG. 2 illustrates an example process of responding using polymorphism to network attacks. FIG. 3 illustrates a second example process of responding using polymorphism to network attacks. For purposes of illustrating clear examples, FIG. 2, FIG. 3 are described herein with reference to the example system of FIG. 1. However, other embodiments of FIG. 2, FIG. 3 may be implemented using other network arrangements or using network security devices that have arrangements different than shown in FIG. 1.

Referring first to FIG. 2, in one embodiment, at block 202, the process receives one or more messages that have been determined as unauthorized or to represent attacks. For example, client computer 102 sends a plurality of messages toward server computer 120, and the messages are intercepted by security device 106 via ingress interface 105. The security device 106 may include attack detection logic, not shown in FIG. 1, which determines that the messages are unauthorized. For example, the messages may represent an attack on network 104 or server computer 120. In general, the determination of whether or not a set of packets, segments, messages or other data arriving on ingress interface 105 is unauthorized, is orthogonal to the approaches described herein and is not described in detail for the reason that any appropriate technique may be used.

Moreover, in some embodiments, block 202 may involve the security device 106 receiving from another computer, other than client computer 102, a function invocation, method call, request message, or other mode of receiving the messages and a signal that they are unauthorized. In other words, the approaches herein do not require the security device 106 to receive messages from client computer 102 directly; the security device may be configured to receive a message or programmatic request from another computing device that provides the messages.

At block 204, the process obtains a plurality of state data values from one or more of: a computing device that received the messages, the one or more messages, and/or a second computer that sent the messages. For example, block 204 may involve state data collection logic 116 obtaining data values for a system clock of security device 106, a system load on the device, a timestamp of a message, attack vector data from attack detection logic such as a severity level, values from packets associated with the messages such as source network address and/or source port value; a length in bytes of packets or messages; or any other values that can be used as a basis for a pseudo-random selection in other steps.

Block 206 indicates that the operations of subsequent blocks are performed before admitting the one or more messages to a network that is protected. At block 208, using pseudo-random selection logic, based on the state data values, a particular policy action is pseudo-randomly selected from among a plurality of different stored policy actions. For example, state data collection logic 116 provides, to pseudo-random generator 114 via policy selection logic 110, the state data values that were collected. In response, the pseudo-random generator 114 generates a pseudo-random value based upon using the state data values as a seed value input to a random number generator. The policy selection logic 110 then receives and uses the pseudo-random value as an index to select one of the message processing policies 112, or a particular message processing action from among a plurality of defined or stored message processing actions. At block 210, the one or more messages are acted upon using the particular policy action.

As a result, a particular set of input data to ingress interface 105, or obtained by the security device 106 from a programmatic call or message, may result in applying any of a plurality of different pseudo-randomly selected responsive actions based upon the state data values and the configuration of the random number generator. An attacker positioned at the client computer 102 who repeatedly presents the same data to the security device 106 will be unable to predict which responsive action will be performed, greatly reducing the ability of the attacker to correlate actions of the security device or the server computer 120 to particular attack vectors.

Referring now to the data processing process of FIG. 3, in an embodiment, at block 302 the process detects an attack represented in one or more messages received over a network and directed to a protected computing device, using an attack matching rule. For example, ingress interface 105 of security device 106 may receive a plurality of packets directed toward server computer 120 and the policy selection logic 110 or other attack evaluation logic may apply a plurality of attack matching rules of which one or more matches the packets. As indicated by block 301, the source of the messages may be data from a network reconnaissance tool that is deployed at client computer 102.

At block 304, the process may quarantine or otherwise hold the one or more messages in a buffer or other storage during evaluation of the messages.

The operations of blocks 306, 308 are optional and are described in other sections below. In some embodiments, after block 304, control proceeds to block 310 at which the process retrieves one or more state data values such as system time, system load, attack severity, and/or source network address. At block 312, using a pseudo-random function, the process determines an index value based upon the state data values. In one embodiment, the security device 106 calculates a hash value based upon run-time information including: system time on the security device; system load (percentage) on the security device; attack severity level; source IP address of client computer 102; any other numeric run-time information that can be used as random seed. Any one of the foregoing may be used, or a combination. Assuming the security device 106 has n number of defined policy actions, the resulting hash value is normalized to be within [1, n].

At block 314, the process determines, from among a set of policy actions, a particular policy action that the index value identifies. For example, the normalized hash value is used to select one policy action from among the actions shown in policy action array 320. In various embodiments, available policy actions may include two or more of: Pass the message(s) toward server computer 120; Drop the message(s) without informing client computer 102; Drop the message(s) and close the connection; Redirect the client computer 102 to an error page; Redirect the client computer 102 to a challenge page such as a CAPTCHA page; Inject an application cookie into the message stream; Block the IP address of client computer 102 by storing IP address information on the security device 106, and/or by informing other computing devices in network 104; Block an application user that is identified in the message(s); Whitelist the IP address of client computer 102; Blacklist the IP address of client computer 102; or others.

At block 318, the policy action that was selected at block 314 is applied to the one or more message(s).

Optionally at block 306 the process may determine a particular policy action that matches the attack matching rule that was matched at block 302. To facilitate this operation, each of the attack matching rules that is used at block 302 may have an associated policy action, so that matching a particular rule indicates that a particular policy action is to be performed. However, the operations of blocks 310, 312, 314 may result in not using the associated policy action but instead using a different, pseudo-randomly selected policy action.

As seen at block 316, optionally the process may write a log record. In one embodiment, the security device 106 records the original policy action and the polymorphic policy action, and saves both of them in the same security event log entries. In this context, the original policy action is the action that is determined at block 306 based upon the attack matching rule that was matched at block 302, and the polymorphic policy action is the action that was selected at block 314. Storing both the policy action associated with a matching rule, and a pseudo-randomly selected action, may provide important forensic information to review and adjust operation of the pseudo-random function or the organization of policy action array 320.

3.2 Coexistence of Regular and Polymorphic Policy Actions

In an embodiment, the polymorphic policy actions selected at block 310, 312, 314 can be implemented together with the regular deterministic policy actions determined at block 302, 306. All such actions may coexist in the same security policy. In one approach, polymorphism is indicated using a flag value that is associated with each policy rule. In this embodiment, the security device 106 performs a polymorphic policy action or a regular policy action, depending on whether the polymorphic flag exists and/or is set. TABLE 1 is an example of policy rules, policy actions, and flag values.

TABLE 1

FLAG VALUES ASSOCIATED WITH ACTIONS

| Number | Rule Match | Policy Action | Flag |
|---|---|---|---|
| 1 | Attack match 1 | Pass | Polymorphic |
| 2 | Attack match 2 | Drop | Polymorphic |
| 3 | Attack match 3 | Close | None |
| 4 | Attack match 4 | Redirect | Polymorphic |
| 5 | Attack match 5 | Redirect | None |
| 6 | Attack match 6 | Block source IP | None |

In the example of TABLE 1, policy rule 1, 2 and 4 will trigger polymorphic policy action, and the remaining policy rules will trigger regular deterministic action. As seen in FIG. 3, this action may be represented by a control operation at block 315 in which the process optionally inspects a flag value associated with a policy action and transfers control either to block 306, block 308, or block 310 depending on whether a flag value is present or set. For example, if block 302 (FIG. 3) results in matching on policy rule 1, then block 306 is skipped and the process proceeds to blocks 310, 312, 314. However, if block 302 results in matching policy rule 3, then blocks 302, 306 determine the policy action to be used, and blocks 310, 312, 314 are omitted so that control moves from block 306 to block 318.

3.3 Scheduled Polymorphic Policy Actions

In an embodiment, security device 106 is configured to implement polymorphism using a configured schedule based on a time window or other inputs. Using scheduled polymorphism has the benefit of confusing the attackers in the same manner as randomization-based polymorphism as previously described. In addition, using scheduled polymorphism provides a flexible way for IT administrators to selectively and programmatically enable policy rules.

Scheduled polymorphism may coexist with randomization-based polymorphism. In one embodiment, each policy rule is associated with a time window during which polymorphism for that rule is in effect. If a time window is defined and the system clock time at the time of processing FIG. 3 is within a defined time window, then the process applies polymorphism regardless of whether the flag value is also present and/or set. The time window option may define a specific policy action, or may enable or disable the entire policy rule. If the time window option is not present or the current system clock time is not within a defined time window, then the process applies polymorphism if the flag value is present and set. TABLE 2 provides an example.

TABLE 2

SCHEDULED POLYMORPHISM

| Number | Rule Match | Policy Action | Flag | Time Window |
|---|---|---|---|---|
| 1 | Attack match 1 | Pass | Polymorphic | None |
| 2 | Attack match 2 | Drop | Polymorphic | Enabled, [9 am Apr. 1, 2014, 9 am May 1, 2014] |
| 3 | Attack match 3 | Close | None | Enabled, Every Monday/Tuesday |
| 4 | Attack match 4 | Redirect | Polymorphic | Drop, [10 am Mar. 1, 2013, 1 pm Sep. 1, 2013] |
| 5 | Attack match 5 | Redirect | None | Close, Every Thursday/Friday |
| 6 | Attack match 6 | Close | Polymorphic | None |

Referring again to FIG. 3, in an embodiment, the process may be configured to determine at block 308 whether a system time is within a time window that is defined for a particular policy action. If the time window is not in effect, then at block 318 the policy action selected previously is used. If the time window is in effect, then control passes through the pseudo-random selection steps to result in applying polymorphism.

3.4 Implementation and Applicability

Both types of polymorphic policy actions can be implemented using the policy selection logic 110 and/or as an extension of an existing security policy action module (not shown in FIG. 1) on a security device 106. The approaches herein can be used on any security devices that perform configurable actions on attack traffic and may be particularly useful on security devices that are constantly facing the evasion challenges from advanced attackers. One benefit of the present approaches is to make evading a security device 106 dramatically harder for an attacker. Another benefit is that the approaches offer a flexible way of selectively and programmatically enabling policy rules.

4. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
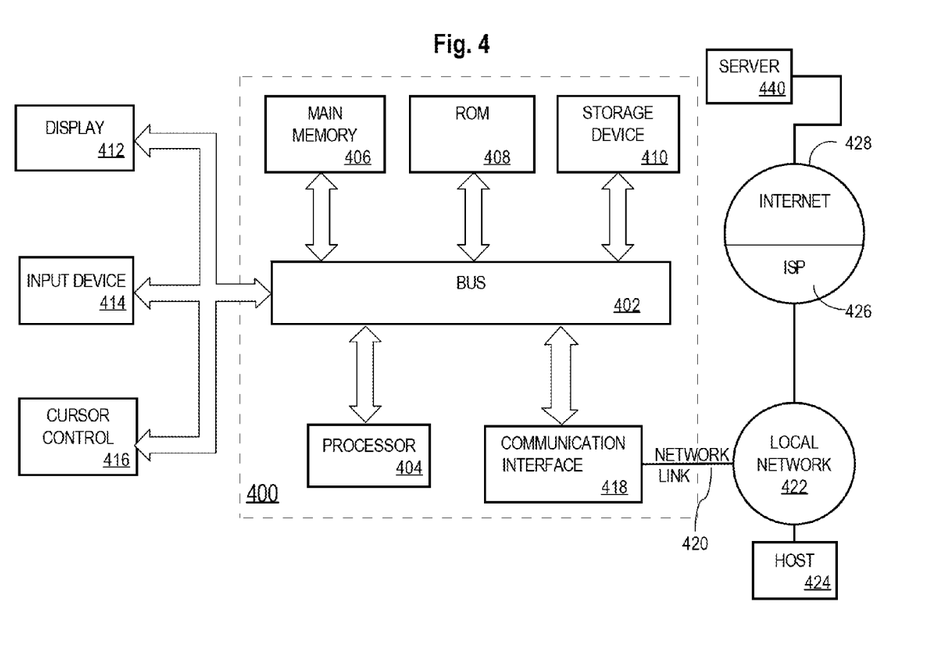
FIG. 4 illustrates a computer system which may be used to implement certain embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Embodiments also encompass the subject matter of the following numbered clauses:

10. An electronic digital network security device comprises one or more processors; one or more first network interfaces that are configured to couple to a client computer; one or more second network interfaces that are coupled to a server computer that the security device is configured to protect from attack; one or more non-transitory computer-readable storage media coupled to the one or more processors and storing one or more sequences of instructions which when executed by the one or more processors cause performing: receiving one or more messages that are determined as unauthorized; obtaining a plurality of state data values from one or more of the security device, the one or more messages, and a second computer; before providing the one or more messages to the server computer: using pseudo-random selection logic, based on the state data values, pseudo-randomly selecting a particular policy action from among a plurality of different stored policy actions; acting upon the one or more messages using the particular policy action.

11. The device of clause 10 wherein the plurality of different policy actions comprises any two or more of: pass, drop request, drop request and close connection, redirect to an error page, inject cookie, block network address, block application user, blacklist network address.

12. The device of clause 10 wherein the plurality of data values comprise any two or more of: system time on the computing device; system load on the computing device; attack severity level; source network address.

13. The device of clause 10, wherein the storage media further comprise sequences of instructions which when executed cause performing the pseudo-randomly selecting only during a particular limited time period that is defined in stored schedule data.

14. The device of clause 10 wherein the state data values comprise one or more attributes of the one or more messages, and one or more operating values indicating operating characteristics of the computing device.

15. The device of clause 10, wherein the storage media further comprise sequences of instructions which when executed cause: using hash value generating logic, generating a hash value that is based upon the state data values; using the pseudo-random selection logic, using the hash value as an index into a list of stored different policy actions, pseudo-randomly selecting a particular policy action from among the plurality of policy actions.

16. The device of clause 10, wherein the storage media further comprise sequences of instructions which when executed cause: determining that the state data values match a particular policy rule from among a plurality of different policy rules; determining that the particular policy rule is marked for polymorphic treatment; using the pseudo-random selection logic, performing the pseudo-randomly selecting using a particular policy action that corresponds to the particular policy rule and a second particular policy action.

17. The device of clause 10, wherein the storage media further comprise sequences of instructions which when executed cause performing the pseudo-randomly selecting only from among a subset of the plurality of different policy actions that include a marking specifying polymorphic treatment.

18. The device of clause 10, wherein the storage media further comprise sequences of instructions which when executed cause: performing the pseudo-randomly selecting only during a particular limited time period that is defined in stored schedule data; performing the pseudo-randomly selecting only from among a subset of the plurality of different policy actions that include a marking specifying polymorphic treatment.

19. A data processing method comprising: using an electronic digital security device, detecting an attack represented in one or more messages received at the security device; before admitting the one or more messages to a network that the security device protects, obtaining one or more first data values relating to then-current state of the security device, and one or more second data values from the one or more messages; using a pseudo-random mapping function, pseudo-randomly mapping a combination of the first data values and the second data values to a particular policy action from among a plurality of policy actions; applying the particular policy action to the one or more messages.

20. The method of clause 19 wherein the plurality of different policy actions comprise any two or more of: pass, drop request, drop request and close connection, redirect to an error page, inject cookie, block network address, block application user, whitelist network address, blacklist network address.

21. The method of clause 19 further comprising: performing the pseudo-randomly selecting only during a particular limited time period that is defined in stored schedule data.

22. The method of clause 19 comprising: using hash value generating logic, generating a hash value that is based upon the first data values and the second data values; using the pseudo-random selection logic, using the hash value as an index into a list of stored different policy actions, pseudo-randomly selecting a particular policy action from among the plurality of policy actions.

23. The method of clause 19 further comprising performing the pseudo-randomly selecting only from among a subset of the plurality of different policy actions that include a marking specifying polymorphic treatment.

24. The method of clause 19 further comprising: performing the pseudo-randomly selecting only during a particular limited time period that is defined in stored schedule data; performing the pseudo-randomly selecting only from among a subset of the plurality of different policy actions that include a marking specifying polymorphic treatment.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of improving the security of a computing device, comprising:
    using a computing device that has received one or more messages that have been determined as unauthorized, obtaining a plurality of state data values from one or more of: the computing device, the one or more messages, and a second computer;
    before admitting the one or more messages to a data communications network that the computing device is configured to protect:
    determining that the plurality of state data values match a particular policy rule from among a plurality of different policy rules;
    determining that the particular policy rule is associated with a first particular policy action;
    determining that the particular policy rule is marked for polymorphic treatment;
    using the computing device and pseudo-random selection logic, based on the plurality of state data values, pseudo-randomly selecting a second particular policy action from among a plurality of different stored policy actions, wherein each of the plurality of different stored policy actions defines a different procedure to follow once an attack has been identified;
    using the computing device, acting upon the one or more messages using the first particular policy action and the second particular policy action.

2. The method of claim 1, wherein the plurality of different stored policy actions comprise any two or more of: pass, drop request, drop request and close connection, redirect to an error page, inject cookie, inject one or more fields within a payload, block network address, block application user, blacklist network address.

3. The method of claim wherein the plurality of state data values comprise any two or more of: system time on the computing device; system load on the computing device; attack severity level; source network address.

4. The method of claim 1, wherein the plurality of state data values comprise one or more attributes of the one or more messages, and one or more operating values indicating operating characteristics of the computing device.

5. The method of claim 1, comprising:
    using hash value generating logic, generating a hash value that is based upon the plurality of state data values;

wherein pseudo-randomly selecting the second particular policy action is based on the hash value.

6. The method of claim 1 wherein the second particular policy action is selected from among a subset of the plurality of different stored policy actions that include a marking specifying polymorphic treatment.

7. The method of claim 1 further comprising:
determining whether a particular time is within a particular limited time period;
wherein pseudo-randomly selecting the second particular policy action is performed in response to determining that the particular time is within the particular limited time period.

8. An electronic digital network security device having improved security comprising:
one or more processors;
one or more first network interfaces that are configured to couple to a client computer;
one or more second network interfaces that are coupled to a server computer that the security device is configured to protect from attack;
one or more non-transitory computer-readable storage media coupled to the one or more processors and storing one or more sequences of instructions which when executed by the one or more processors cause performing:
receiving one or more messages that are determined as unauthorized;
obtaining a plurality of state data values from one or more of the security device, the one or more messages, and a second computer;
before providing the one or more messages to the server computer:
determining that the plurality of state data values match a particular policy rule from among a plurality of different policy rules;
determining that the particular policy rule is associated with a first particular policy action;
determining that the particular policy rule is marked for polymorphic treatment;
using pseudo-random selection logic, based on the plurality of state data values, pseudo-randomly selecting a second particular policy action from among a plurality of different stored policy actions, wherein each of the plurality of different stored policy actions defines a different procedure to follow once an attack has been identified;
acting upon the one or more messages using the first particular policy action and the second particular policy action.

9. The device of claim 8, wherein the plurality of different stored policy actions comprise any two or more of: pass, drop request, drop request and close connection, redirect to an error page, inject cookie, block network address, block application user, whitelist network address, blacklist network address.

10. The device of claim 8, wherein the plurality of state data values comprise any two or more of: system time on the device; system load on the device; attack severity level; source network address.

11. The device of claim 8, wherein the plurality of state data values comprise one or more attributes of the one or more messages, and one or more operating values indicating operating characteristics of the device.

12. The device of claim 8, wherein the storage media further comprise sequences of instructions which when executed by the one or more processors cause performing:
using hash value generating logic, generating a hash value that is based upon the plurality of state data values;
wherein pseudo-randomly selecting the second particular policy action is based on the hash value.

13. The device of claim 8, wherein the second particular policy action is selected from among a subset of the plurality of different stored policy actions that include a marking specifying polymorphic treatment.

14. The device of claim 8, wherein the storage media further comprise sequences of instructions which when executed by the one or more processors cause performing:
determining whether a particular time is within a particular limited time period;
wherein pseudo-randomly selecting the second particular policy action is performed in response to determining that the particular time is within the particular limited time period.

* * * * *